Figure 1:
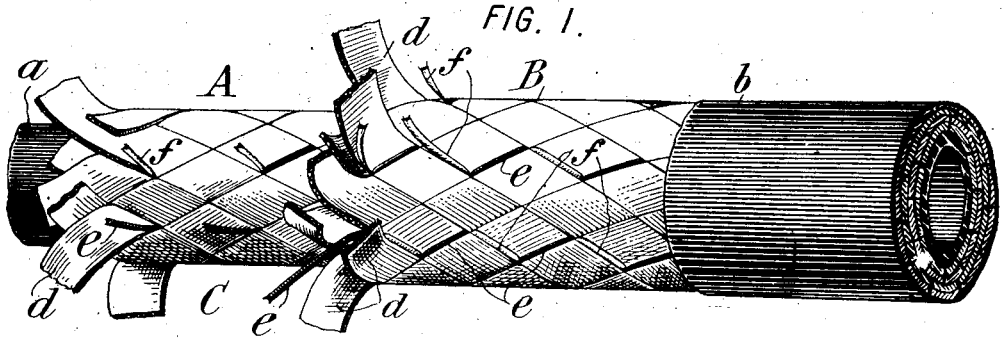

H. Z. COBB.
BRAIDED HOSE.
APPLICATION FILED APR. 12, 1909.

957,867.

Patented May 17, 1910.

WITNESSES:

INVENTOR:
Henry Z. Cobb,
By Attorneys,

UNITED STATES PATENT OFFICE.

HENRY Z. COBB, OF MALDEN, MASSACHUSETTS, ASSIGNOR TO REVERE RUBBER COMPANY, OF BOSTON, MASSACHUSETTS, A CORPORATION OF MASSACHUSETTS.

BRAIDED HOSE.

957,867.

Specification of Letters Patent.

Patented May 17, 1910.

Application filed April 12, 1909. Serial No. 489,305.

*To all whom it may concern:*

Be it known that I, HENRY Z. COBB, a citizen of the United States, residing at Malden, in the county of Middlesex and State of Massachusetts, have invented certain new and useful Improvements in Braided Hose, of which the following is a specification.

This invention relates to braided hose or analogous tubular fabrics.

It is common to make braided hose by braiding one, two or more yarns or strands from each of the bobbins of the braider, the strands being either alternated at each crossing so as to braid a plain weave, or being overcast for the width of two or more strands, so as to form a more open weave. In the making of braided hose it is common to braid the fabric upon a lining tube of rubber, and to cover the braided fabric with a tube or layer of rubber or rubber composition. For a two-ply hose a second layer of fabric is braided around this rubber covering. Upon the vulcanizing of the hose the braided web, or each braided layer, is impregnated with the rubber of the inner and outer layers between which the braided fabric is embraced.

A braided hose has the advantage over a woven hose that by reason of the oblique or spiral direction or pitch of the threads or yarns composing the fabric, it is more flexible than a woven fabric where the warps extend longitudinally and the wefts in substantially transverse direction circumferentially of the hose. A braided hose is also less liable to kink when sharply bent. On the other hand a woven hose has certain advantages over a braided hose, particularly in strength and cheapness.

The present invention provides a novel construction of hose which combines the advantages of both a woven and a braided hose.

The hose is made with one or more braided layers or webs each consisting of strips or tapes of textile fabric braided together. These tapes are best made of woven fabric in any suitable length, and of a width which may approximate one-fourth or three-eighths of an inch. The tapes may be woven of this width, thus securing selvages on both edges; or for greater cheapness the tapes may be strips cut from a wide web of woven duck. The tapes, or the fabrics from which the tapes are thus cut, are associated or treated with rubber, as by being coated or impregnated, preferably on both sides, with rubber or rubber composition. It is preferable to friction the fabric in the well-known way. For a single-ply hose the tapes thus formed are braided together upon an inner tube, and are preferably covered with a layer of rubber or composition. For a two-ply or multiple-ply hose, two or more of such braided webs are superposed, the one around the other, with if desired a coating or layer of rubber between, although on account of the frictioning of the strips or tapes this is not indispensable. For a multiple-ply hose it is preferable to braid on the plural layers of fabric simultaneously, and to simultaneously unite them by braiding in interlacing threads or strands of suitable yarn, whereby to sew together the successive layers of braided tapes.

Figure 2:
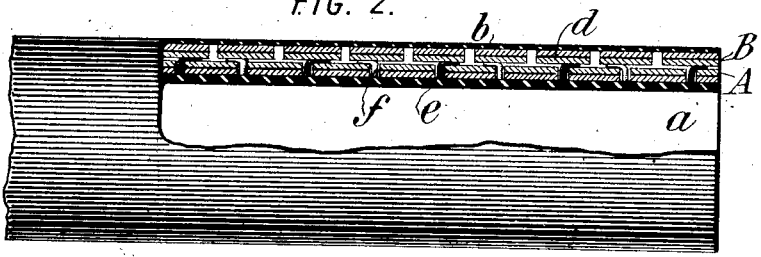
Figure 3:
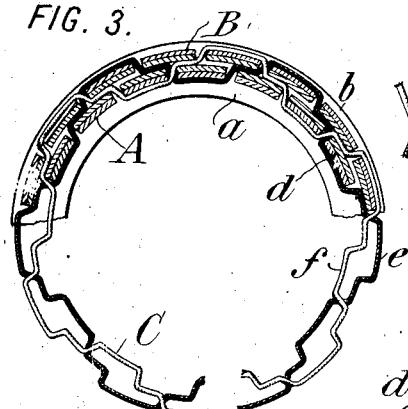
Figure 4:
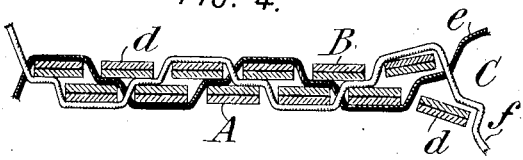
Figure 5:
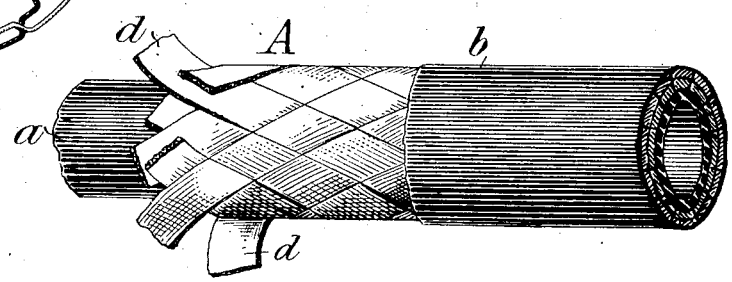
Figure 6:
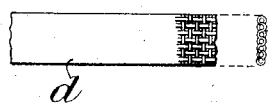

Figure 1 of the accompanying drawings is an oblique projection partly dissected away, showing the preferred embodiment of my invention in a two-ply hose. Fig. 2 is an elevation thereof partly in longitudinal section. Fig. 3 is a transverse section showing somewhat diagrammatically the interlacing strands, the remainder of the fabric being partly dissected away for this purpose. Fig. 4 is a diagrammatic section, braided fabrics being cut longitudinally and the interlacing strands being shown diagrammatically. Fig. 5 is a dissected oblique elevation of a single-ply hose. Fig. 6 shows one of the tapes or woven strips.

I will first describe the simple form of the invention shown in Fig. 5. Upon an inner tube $a$, usually of pure rubber, is formed the braided fabric A, this being covered by the usual covering $b$ of rubber or composition. The braided fabric A is made by braiding together strips $d$ $d$, one of which is shown separately in Fig. 6. These strips, which I will call tapes, are of woven fabric, preferably duck, and treated with rubber or rubber composition, so as to be impregnated or coated therewith, being preferably frictioned on both sides. They may or may not have selvaged edges. These tapes are applied by being wound separately on suitable bobbins which are mounted in any ordinary or suitable braiding machine, although they might be manipulated by hand. The tapes are laid on flatwise, that is, without any twist which would bring them into edgewise relation with the core surface, and without doubling them upon themselves. Preferably each tape is alternated with the next at each intersection, so as to braid a plain weave. Or the tapes may be passed over two and under two. The tapes should be drawn as close together as possible at each intersection, so as to eliminate any holes or openings between them where they cross. The braided fabric having been thus applied, and having been covered with the exterior layer b, the entire hose is vulcanized in the ordinary manner. This by reason of the frictioning of the tapes cements each tape to the one crossing it, at the same time cementing the inner and outer rubber tubes to the braided fabric. Thus the entire structure is rendered integral, the braided fabric giving the requisite strength while affording also the desirable flexibility.

The two-ply fabric shown in Figs. 1 to 4 differs from that shown in Fig. 5 chiefly in that a second braided layer B is formed over the first. The second layer might be braided on either simultaneously or subsequently. It is preferable to braid the two layers A and B simultaneously, and also to unite or tie them together by means of interlacing strands C of threads or yarns, or even of cords or wires if desired, which are braided in simultaneously, and which cross through the braided webs A and B at the intersections of the tapes forming these layers. These interlacing strands C are in the drawing indicated as of black and white yarns respectively, the former being shown at e and the later at f whereby to distinguish them. In Figs. 3 and 4 these yarns e and f are shown diagrammatically, these views necessarily ignoring the oblique extension of the strands, so that Fig. 3 shows them as if they extended circumferentially, and Fig. 4 shows them as if they extended longitudinally.

In respect of the interlacing strands C, the fabric here shown resembles that set forth in my application for Patent No. 376,198, filed May 28, 1907 (patented October 12, 1909, No. 937,024). The advantage in the use of these interlacing strands is that they tie the two braided layers more intimately together, so as to render them practically inseparable, but without detracting from the flexibility and other advantages of the hose.

From this description it will be understood that my invention is distinguished from the ordinary braiding of hose in that instead of braiding strands or yarns, the braiding is performed with strips or tapes of textile or woven fabric. These tapes are rubber-treated, that is they are coated or impregnated with rubber or rubber composition, preferably by frictioning.

The hose produced according to my invention has important practical advantages. It possesses great strength, since it admits of the use of tapes of woven duck or other fabric which can be given ample strength to fit the hose for its intended use. The hose, while having a desirable elasticity, is practically free from elongation under internal pressure. It has the maximum of flexibility consistent with the required strength, being particularly free from liability to kink when bent into a curve of small radius. The hose is exceptionally smooth, both internally and externally. It is especially free from liability to puncture. If properly made, no air pockets or bubbles are formed which give rise to imperfections in the hose during vulcanizing. The improved hose combines the advantages of a duck hose either woven or wrapped, and of a braided hose, having the strength of the former and the flexibility and non-kinking qualities of the latter. A very important advantage is that it is cheaper to manufacture than braided hose or seamless woven hose, since the braiding on of the broad tapes proceeds with great rapidity. Ordinary braided hose is liable to contain loose or open portions where the braided strands are not drawn closely together, so that at their intersections open spaces or hollows are left, into which the lining tube is forced by the internal pressure applied during vulcanizing, these spaces being often sufficiently open to form or lead to punctures either during vulcanizing or in the subsequent use of the finished hose to carry internal pressure; my improved hose is practically free from this defect.

My invention is applicable not only to pressure hose, but also to suction hose.

What I claim is:

1. A vulcanized hose of braided tapes of textile fabric associated with rubber.

2. A vulcanized hose of braided tapes of textile fabric treated with rubber.

3. A vulcanized hose of braided tapes of frictioned textile fabric.

4. A vulcanized hose of a plurality of layers of braided tapes of textile fabric treated with rubber.

5. A vulcanized hose of a plurality of layers of braided tapes of rubber-treated textile fabric with intervening rubber.

6. A vulcanized hose of a plurality of layers of braided tapes of frictioned textile fabric.

7. A hose of a plurality of layers of braided tapes and a braided web of interlacing strands uniting said layers.

8. A vulcanized hose of a plurality of layers of braided tapes of frictioned fabric and a braided web of interlacing strands uniting said layers.

9. A vulcanized hose of an inner rubber tube and two layers of braided tapes of textile fabric with intervening rubber and an outer rubber covering.

10. The process of making hose comprising braiding together tapes of textile fabric associated with rubber and subsequently vulcanizing the hose.

11. The process of making hose comprising braiding together tapes of rubber-treated textile fabric.

12. The process of making hose comprising braiding upon an inner tube a layer of tapes of rubber-treated textile fabric.

13. The process of making hose comprising braiding two layers of tapes of rubber-treated textile fabric, one around the other.

14. The process of making hose comprising simultaneously braiding two layers of tapes of textile fabric and a braided web of interlacing strands uniting said layers.

15. The process of making hose comprising braiding upon an inner tube a layer of tapes of rubber-treated textile fabric, applying an outer layer of rubber, and vulcanizing.

In witness whereof, I have hereunto signed my name in the presence of two subscribing witnesses.

HENRY Z. COBB.

Witnesses:
ARTHUR C. FRASER,
FRED WHITE.